PHASE COMPARISON MICROWAVE DISCRIMINATOR

Filed March 1, 1968

INVENTORS M. D. BONFELD
E. G. JAASMA

BY Roy M. Porter Jr.
ATTORNEY 3,530,387
PHASE COMPARISON MICROWAVE DISCRIMINATOR Murray D. Bonfeld, Allentown, Pa., and Edward G. Jaasma, Colts Neck, N.J., assignors to Bell Telephone Laboratories, Incorporated, Berkeley Heights, N.J., a corporation of New York Filed Mar. 1, 1968, Ser. No. 709,732
Int. Cl. H03d *9/02*
U.S. Cl. 329—116 6 Claims

ABSTRACT OF THE DISCLOSURE

A microwave discriminator of the phase comparison type suitable for strip line construction in which an impedance mismatch, variable in both size and position, is used with circulators to divide a frequency modulated signal between two paths of different loss and delay so that when signals from the two paths are recombined by a similar mismatch-circulator combination they sum to produce a net amplitude proportional to frequency.

BACKGROUND OF THE INVENTION

This invention relates to microwave frequency modulation discriminators and more particularly to integrated strip line microwave discriminators of the phase comparison type.

The art is familiar with a form of microwave discriminator in which an input signal reaches an output terminal by way of two different paths having losses that are identical but lengths that are different by a precise amount. Thus the waves at an output terminal have identical amplitudes and a phase difference that is proportional to frequency so that they may be summed to produce a net amplitude proportional to frequency. While straightforward in principle, this phase comparison discriminator is cumbersome to realize with available microwave hardware because the required relative values of loss and phase of the two paths are very critical if a specified crossover frequency and a symmetrical characteristic are to be obtained with maximum sensitivity. These difficulties are pointed out in detail with respect to both waveguide and coaxial transmission line embodiments using 3 db hybrid couplers in an article entitled "Design of Phase Discriminators" by Katz and Schreiber, August 1965 Microwaves page 26.

SUMMARY OF THE INVENTION

In accordance with the present invention a phase comparison discriminator is realized in strip line form by employing an impedance mismatch, variable in both size and position, in combination with particularly arranged circulators to divide the input energy between a meandering strip line delay path and a short, direct path. Ready adjustment of the impedance mismatch allows the input power to be divided between the paths in the proper phase required for discriminator action about any specified crossover frequency in a wide band and in the proper amplitude to adjust for the relatively large losses of the strip line delay path. In a particular embodiment the input power is applied through a first circulator to the mismatch which reflects less than half of the power through the circulator into the direct path and passes more than half the power into the delay path. A final pair of circulators and a further mismatch interconnects the other ends of the paths and applies half the power from each path to each of a pair of diodes which appropriately sum the currents and produce the desired output characteristic.

DETAILED DESCRIPTION

Figures 1, 2, 3A, 3B, 3C:
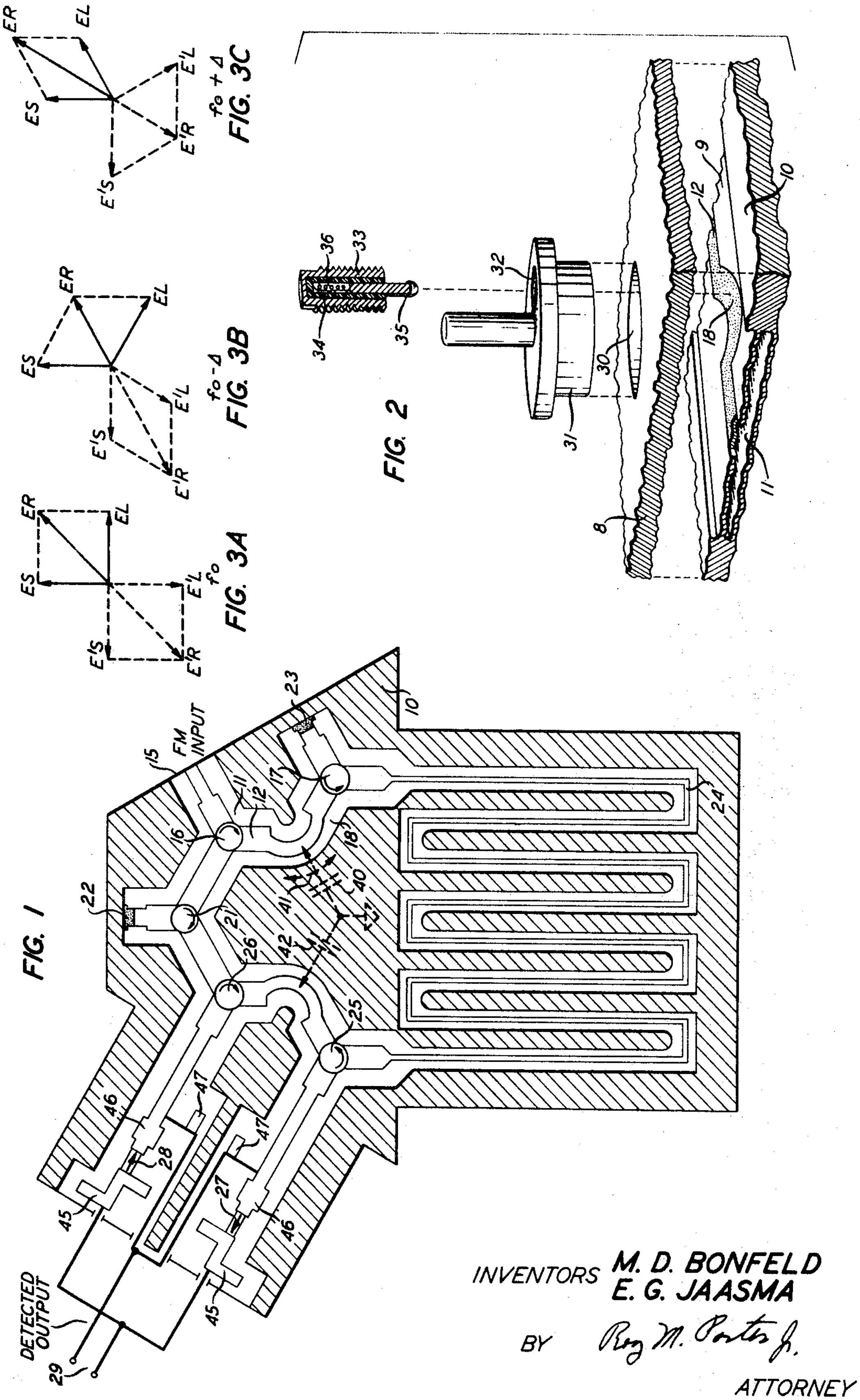
FIG. 1 is a top plane view of the strip line layout in accordance with the invention.
FIG. 2 is an exploded perspective view of a portion of the layout of FIG. 1.
FIGS. 3A, 3B and 3C are vector diagrams useful in explaining the operation of the invention.

Referring more particularly to FIG. 1 an illustrative embodiment of a discriminator is shown using the symmetrical type TEM transmission line, sometimes referred to as strip line, in which a thin center conductor is interposed between a pair of conductive ground planes. It should be understood however that the invention may be applied to lines of the nonsymmetrical type, sometimes referred to as the Microstrip in which a single ground plane only is employed. For simplicity of illustration the top ground plane has been removed in FIG. 1 so that the configuration of the center strip conductor can be observed. Typically the circuit is integrated in a single cast or pressed metal body 10 in which channels or grooves 11 are formed, the wider inside surfaces of which form ground planes. The strip conductor 12 is typically supported in this channel by being formed of conductive material plated or printed upon a suitable thin substrate of high dielectric material. It should be understood however that the invention may be applied to lines of self-supporting center conductor or to conductors comprising plated or printed surfaces in the familiar sandwich construction.

Regardless of construction, the strip configuration may be traced by starting at input 15 comprising one arm of a first circulator 16 having at least three arms and a sequential transmission of energy between the arms as illustrated by the curved arrows thereon. Suitable circulators in a number of forms are well known in the art and any of these forms may be used to practice the broad principles of the invention. Particularly adapted strip line forms are described, for example, in textbooks such as Microwave Ferrites and Ferrimagnetics by Lax & Button, 1962, pages 517 and 609; in publications such as Fay & Comstock "Operation of the Ferrite Junction Circulator" 13 IEEE Transactions MT&T, pages 15 through 27, January 1965; or in patents such as Davis 3,065,024, Nov. 6, 1962.

The next successive arm of circulator 16 is connected to one arm of a second circulator 17 by a strip containing an arcuate section 18 which according to a preferred design is a quarter wavelength or more in arcuate length. A variable reactance now to be described in connection with FIG. 2 is located in a variable position along section 18.

Referring to FIG. 2, details of this reactance, as well as further details of a typical strip line construction may be seen. Thus FIG. 2 illustrates in an exploded view a small part of body 10 having the channel 11 formed therein, a typical substrate of dielectric material 9 supporting a thin strip of conductive material 12 including arcuate section 18. A portion of a top plate 8 is shown which forms the upper ground plane having a circular hole 30 located therein which receives a conductive plug 31 rotatable in hole 30. Plug 31 includes an eccentrically located, threaded hole 32 so positioned so that when plug 31 is turned, hole 32 moves over and along the length of the arcuate section 18 of the center conductor strip 12. Adapted to be received by the threads in hole 32, is a coaxial assembly comprising, from the outside in, a conductive cylinder 33 having external threads matching those of 32, a cylinder 34 of high dielectric constant material and a center core 35 of conductive material loaded by compressional spring 36 so that core 35 tends to move out of dielectric cylinder 34. When assembled, core 35 makes firm electrical contact with a point on section 18 of strip 12. When the penetration of cylinder 33 into hole 32 is varied, core 35 moves against the compression spring 36 to increase or decerase the extent of coextension of core 35 with cylinder 33, thereby increasing or decreasing the capacitance across dielectric 34 to ground. While the assembly thus described is particularly and uniquely adapted for its function, it should be understood that other means for producing a capacitance, variable in magnitude and position, may be used to practice the invention insofar as the overall discriminator circuit is concerned. For this reason and also for convenience in the description which follows, the capacity produced by the assembly of FIG. 2 is illustrated on FIG. 1 schematically by a capacitor 40 variable in both size and position as schematically represented by the vectors 41. Thus capacitor 40 serves as a substantially pure reactive impedance discontinuity adjusted so that somewhat more than one half the input power incident upon it is reflected back to circulator 16 with a phase difference between the reflected and transmitted components of 90 degrees in addition to an additional phase difference that depends as will be shown on the position of capacitor (reactive discontinuity) 40 along arcuate section 18.

The reflected power passes back through the third arm of circulator 16 to circulator 21 and th transmitted portion of the power passes to circulator 17. Both of circulators 21 and 17 may be identical to circulator 16 except that the third arm of each is terminated in dissipative terminations 22 and 23 respectively so that the terminated circulators function as isolators.

Power leaving circulator (isolator) 17 is applied to one end of a meandering strip delay line 24 of an electrical length many wavelengths long as will be specified hereinafter. To shorten the physical length required for a given electrical length it is preferred that the line be fully loaded, i.e., that the space between the strip conductor and the ground plane be completely filled with a low loss, high dielectric constant material to reduce the velocity of propagation therealong as much as possible. To retain a characteristic impedance which matches that of the lightly loaded portions of the strip line configuration, it is preferred that delay line 24 have a strip width that is less than that of the unloaded strip width. In the meandering configuration shown it has been found that reflections from the several bends can be reduced to a uniform minimum loss over a broadband if the shorter legs between adjacent bends are each an odd number of one-quarter wavelengths at the midband frequency and if the longer legs are an even number of one-quarter wavelengths. Thus reflections from bends at either end of each short leg cancel at the midband frequency and reflections from the bends of either end of a long leg tend to cancel at the band edges. Any net residual reflections are dissipated in termination 23 of circulator (isolator) 17.

Output circulators 26 and 25 are polarized so that the transmission of power between their arms is in clockwise and counterclockwise sequences respectively in order to simplify the layout. The first arm of circulator 26 receives the power from circulator (isolator) 21 while the first arm of circulator 25 receives the delayed portion of the power from line 24. The next successive arms of both circulators 25 and 26 are connected together and to a shunt capacitive reactance 42 located midway between circulators 25 and 26. Reactance 42 may be produced by an assembly like that of FIG. 2 although it need not be adjustable in position and is illustrated for convenience schematically on FIG. 1. Reactance 42 comprises an impedance discontinuity and has such a value that one-half of the power incident upon it from either circulator is reflected while the remaining one half is transmitted to the other circulator. The third successive arms of both circulators 25 and 26 are terminated in microwave diode detectors 27 and 28, respectively, the outputs of which are connected in parallel in oppositely poled relationship, i.e., the anode of one and the cathode of the other are connected in common to one side of output 29 while the remaining diode terminals form the other side of the output. Suitable circuits for decoupling the microwave energy on the strip line from the detected direct current are standard in the art and are illustrated by elements 45 and 47. Strip line 46 matches the line impedance to that of the diodes in accordance with usual practice.

A "long" and a "short" path from input 15 to either diode 27 or 28 may now be identified. Thus the long path is that of energy which passes the discontinuity formed by capacitive reactance 40, travels through circulator (isolator) 17, traverses path 24 to circulator 25 and is then either reflected by reactance discontinuity 42 to diode 27 or passes discontinuity 42 through circulator 26 to diode 28. On the other hand the short path is that of the energy which is reflected by discontinuity 40, travels back through circulator 16, through circulator (isolator) 21 to circulator 26, and is then either reflected by reactance discontinuity 42 through circulator 26 to diode 28 or passes reactance discontinuity 42, through circulator 25 to diode 27.

FIGS. 3A, 3B and 3C illustrate with typical vector diagrams the phase and amplitude relationships required for these components for phase comparison discrimination. The signals arriving at diode detectors 27 and 28 over the above-defined long and short paths are designated $E_L$ and $E_S$ respectively. The signals arriving at one detector are designated by solid vectors and those at the other detector by broken line vectors $E_L'$ and $E_S'$ with an appropriate reversal in sense of the vectors representing the result of poling the detectors in opposite directions. The phase and amplitude conditions necessary for discriminator operation are defined for a given undeviated carrier or crossover frequency $f_0$ by FIG. 3A. Thus the long and the short path components need to be of equal amplitudes and in phase quadrature with each other at each detector as are $E_S$ and $E_L$ at one detector and $E_S'$ and $E_L'$ at the other detector, and in phase quadrature with the other half of the same component between opposite detectors as are $E_S$ and $E_S'$ or $E_L$ or $E_L'$. The resultants $E_R$ and $E_R'$ at each diode are then equal in absolute amplitude and the resultant currents cancel in the combined output 29 of the oppositely poled detectors 27 and 28. If the frequency is varied from $f_0$ by the deviation $\Delta$, the phase of components traveling over respective paths will shift in a given direction by an amount proportional to the length of that path. If the long path is many times the length of the short path, the shifts of the vectors $E_L$ and $E_L'$ will be great in comparison to the shifts of the vectors $E_S$ and $E_S'$ as illustrated in FIG. 3B or C respectively. For a shift in one direction such as to $f_0-\Delta$ the resultant $E_R'$ at one diode will be greater than the resultant $E_R$ at the other as in FIG. 3B, and for a shift in the other direction such as to $f_0+\Delta$ the resultant vector $E_R$ at the other diode will be greater than $E_R'$ as shown in FIG. 3C. Since the total phase shift of either path is the sum of the incremental phase shifts in each wavelength long section of that path, the longer the long path in relation to the short path, the faster the phase change with frequency and the steeper the discriminator characteristic. The phase and amplitude relationships thus far described in connection with FIG. 3 are found also in other phase comparison discriminators known in the art, and the features of the present invention reside in the simple, economical and readily adjustable apparatus by which these relationships are obtained.

Reactive discontinuity 42 is located midway between circulators 25 and 26 and has such a magnitude that half of the energy incident upon it from either path is reflected. Since the reactance is lossless, the phase shift between the reflected and transmitted components is 90 degrees. Therefore the required quadrature relationship at opposite detectors for the respective long path components $E_L$ and $E_L'$ or between the short path components $E_S$ and $E_S'$ is obtained.

More significant however is the locaton and magnitude of reactive discontinuity 40. Note that the length of the long path to either diode is independent of position of discontinuity 40, the position of which determines the length of the short path only. It is therefore only necessary to make the long path through delay line 24 many times that of the short path. Then the length of the short path is independently adjusted so that at the desired crossover frequency, $E_S$ or $E_S'$ is in quadrature with $E_L$ or $E_L'$ at each diode.

Recognizing that the 90 degree phase shift introduced by discontinuities 40 or 42 between reflected and transmitted components is independent of frequency and of the magnitude or location of the discontinuities while the phase shift introduced by either path length depends upon frequency, two criteria will define the conditions which exist for proper adjustment of the discriminator at a given crossover frequency $f_0$. Thus the frequency sensitive difference in the long and short path lengths from the input to either detector is a large odd multiple of quarter wavelengths at $f_0$ so that $E_S$ and $E_L$ are in quadrature at $f_0$ but at other angles to each other as frequency changes. Secondly, the frequency independent difference in phase along either path to opposite diodes is 90 degrees at any frequency so the $E_L$ and $E_L'$, for example, are in quadrature. In accordance with the invention adjustment to the first condition is obtained without careful measurement of the length of delay line 24, of any of the several connecting strips, or of the delay through the several circulators. Instead plug 31 is rotated to determine the position at which core 35 contacts section 18. The length of the short path is accordingly varied by twice any movement of the core 35. Since the length of section 18 is at least one-quarter wavelength at the operating frequency, tuning of the discriminator over a broadband to obtain the required phase relationships at any desired crossover frequency is obtained irrespective of inherent and unknown phase delays through the several components.

Finally the losses through the long path, including the relatively large losses of delay line 24, are obviously greater than the losses through the shorter path but of unknown amount. Equal power at detectors 27 and 28 is obtained in accordance with the invention by the simple adjustment of the penetration of cylinder 33 so that additional power to equalize the additional loss of the long path is transmitted past discontinuity 40 and less power is reflected back into the short path. Thus no awkward, inefficient and power wasting attenuators are required to balance the paths.

It should be understood that the strip line layout as shown in FIG. 1 is one of convenience as to configuration and is to some extent arbitrary. For example, terminated circulators 17 and 21 serving as isolators can be omitted if reflected signals at their locations are found to be minor. On the other hand, further terminated circulators serving as isolators can be added at other locations, either in addition to or replacing circulators 17 and 21. For example, the required degree of impedance match to diodes 27 and 28 can be reduced by including terminated circulators in the connecting strips between these diodes and circulators 25 and 26, respectively.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A microwave detection circuit comprising
an input circulator having at least three arms and a successive transfer of power between said arms,
means for applying a signal modulated in frequency to a first of said arms,
a first microwave signal path extending from the second successive one of said arms and a second microwave signal path extending from the third successive arm of said circulator,
means for combining and detecting the amplitude sum of signal components which have travelled over both respective paths, and
means for varying the length of said second microwave signal paths relative to said first microwave signal path and for varying the signal power between said paths to produce signals the net amplitude of whose sum is proportional to frequency after having traversed said signal paths comprising means for producing a reactive impedance mismatch adjustable in location and magnitude in said second arm of said circulator.

2. The circuit according to claim 1 wherein said impedance mismatch is substantially pure capacitive.

3. A circuit according to claim 1 wherein the electrical lengths of said first and second paths are substantially different.

4. A microwave detection circuit comprising
an input circulator having at least three arms and a successive transfer of power between said arms,
means for applying a signal modulated in frequency to a first of said arms,
means for producing a reactive impedance mismatch in the second succesive one of said arms,
a first microwave signal path extending beyond said impedance mismatch from said second arm,
a second microwave signal path extending from the third successive arm of said circulator, and
means for combining and detecting the amplitude sum of signals which have travelled over the respective paths comprising a pair of further circulators having one arm of each respectively connected to the extending ends of said paths, having one arm of each interconnected through a further reactive impedance mismatch, and having one arm of each respectively terminated in oppositely poled diode detectors.

5. A microwave detection circuit comprising
an input circulator having at least three arms and a successive transfer of power between said arms,
means for applying a signal modulated in frequency to a first of said arms,
means for producing a reactive impedance mismatch in the second successive one of said arms comprising a hollow conductive body having a conductive core within and separated from said body by dielectric material to form a capacitor,
a first microwave signal path extending beyond said impedance mismatch from said second arm, said capacitor being connected in shunt across said first path,
a second microwave signal path extending from the third successive arm of said circulator, and
means for combining and detecting the amplitude sum of signals which have travelled over the respective paths.

6. A microwave detection circuit comprising
an input circulator having at least three arms and a successive transfer of power between said arms,
means for applying a signal modulated in frequency to a first of said arms,
means for producing a reactive impedance mismatch in the second succesive one of said arms,
a first microwave signal path extending beyond said impedance mismatch from said second arm, a second microwave signal path extending from the third successive arm of said circulator, and means for combining and detecting the amplitude sum of signals which have travelled over the respective paths comprising a further circulator having a first arm connected to the extending end of one of said paths, a second arm connected to the extending end of the other of said paths, and a third arm connected to a diode detector, and a further reactive impedance mismatch in the extending end of one of said paths.

References Cited

UNITED STATES PATENTS

| | | | |
|---|---|---|---|
| 3,139,592 | 6/1964 | Sisson | 329—116 X |
| 3,195,051 | 7/1965 | Chang | 333—241 X |
| 3,339,158 | 8/1967 | Passaro | 333—1.1 |

ALFRED L. BRODY, Primary Examiner

U.S. Cl. X.R.

325—445, 449; 329—160; 333—1.1, 24